US006804678B1

(12) United States Patent
Luo et al.

(10) Patent No.: US 6,804,678 B1
(45) Date of Patent: Oct. 12, 2004

(54) NON-BLOCKING PARALLEL BAND JOIN ALGORITHM

(75) Inventors: Gang Luo, Madison, WI (US); Curt J. Ellmann, Madison, WI (US); Jeffrey F. Naughton, Madison, WI (US)

(73) Assignee: NCR Corporation, Dayton, OH (US)

( * ) Notice: Subject to any disclaimer, the term of this patent is extended or adjusted under 35 U.S.C. 154(b) by 490 days.

(21) Appl. No.: 09/817,722

(22) Filed: Mar. 26, 2001

(51) Int. Cl.$^7$ .............................................. G06F 17/30
(52) U.S. Cl. .............................. 707/101; 707/2; 707/3; 707/5; 707/102; 707/103; 707/104
(58) Field of Search ............................... 707/2, 3, 100, 707/102, 201, 5, 101, 103, 104

(56) References Cited

U.S. PATENT DOCUMENTS

| | | | | |
|---|---|---|---|---|
| 4,930,072 A | * | 5/1990 | Agrawal et al. ............ | 707/101 |
| 5,551,031 A | * | 8/1996 | Cheng et al. ................... | 707/2 |
| 5,557,791 A | * | 9/1996 | Cheng et al. ................... | 707/2 |
| 5,745,896 A | * | 4/1998 | Vijaykumar ................. | 707/100 |
| 5,832,475 A | * | 11/1998 | Agrawal et al. ................ | 707/2 |
| 6,032,144 A | * | 2/2000 | Srivastava et al. ............. | 707/3 |
| 6,061,676 A | * | 5/2000 | Srivastava et al. ............. | 707/3 |
| 6,081,801 A | * | 6/2000 | Cochrane et al. ............. | 707/3 |
| 6,112,198 A | * | 8/2000 | Lohman et al. ................ | 707/3 |
| 6,205,441 B1 | * | 3/2001 | Al-omari et al. .............. | 707/2 |
| 6,226,639 B1 | * | 5/2001 | Lindsay et al. ................ | 707/5 |
| 6,415,297 B1 | * | 7/2002 | Leymann et al. ........... | 707/201 |
| 6,484,159 B1 | * | 11/2002 | Mumick et al. ............... | 707/2 |
| 6,493,701 B2 | * | 12/2002 | Ponnekanti .................... | 707/2 |
| 6,618,719 B1 | * | 9/2003 | Andrei .......................... | 707/2 |
| 6,625,593 B1 | * | 9/2003 | Leung et al. ................... | 707/2 |
| 2002/0103793 A1 | * | 8/2002 | Koller et al. ................... | 707/3 |

OTHER PUBLICATIONS

R. Avnur et al., "Eddies: Continuously Adaptive Query Processing", SIGMOD Conf. 2000, pp. 261–272.

D. Bitton et al., "Benchmarking Database Systems a Systematic Approach", VLDB 1983, pp. 8–19.

J. Chen et al., "NiagaraCQ: A Scalable Continuous Query System for Internet Databases", SIGMOD Conf. 2000, pp. 379–390.

D. DeWitt et al., "A Performance Analysis of the Gamma Database Machine", SIGMOD Conf. 1988, pp. 350–360.

D. DeWitt et al., "Client–Server Paradise", VLDB 1994, pp. 558–569.

D. DeWitt et al., "An Evaluation of Non–Equijoin Algorithms", VLDB 1991, pp. 443–452.

G. Graefe, "Query Evaluation Techniques for Large Databases", ACM Comput. Surveys, 25(2):73–170, Jun. 1993.

P. Haas et al., "Join Algorithms for Online Aggregation", IBM Research Report RJ10126, 1998.

P. Haas, "Techniques for Online Exploration of Large Object–Relational Datasets", Proc. 11th Intl. Conf. Scientific and Statistical Database Management, 1999, pp. 4–12.

J. Hellerstein et al., "Interactive Data Analysis: The Control Project", IEEE Computer, 32, Aug. 1999, pp. 51–59.

J. Hellerstein et al., "Informix under CONTROL: Online Query Processing", Data Mining and Knowledge Discovery, 2000.

J. Hellerstein, "Online Processing Redux", IEEE Data Engineering Bulletin, Sep. 1997.

(List continued on next page.)

Primary Examiner—Thuy N. Pardo
(74) Attorney, Agent, or Firm—Trop, Pruner & Hu, P.C.; Harden E. Stevens; John D. Cowart

(57) ABSTRACT

A non-blocking parallel band join method and apparatus partitions tuples of two relations for localized processing. At each processing node, the tuples are further partitioned such that join operations may be performed efficiently, as tuples are received by the node during the partitioning.

16 Claims, 13 Drawing Sheets

OTHER PUBLICATIONS

J. Hellerstein, "Looking Foward to Interactive Queries", Database Programming and Design, Aug. 1998.

J. Hellerstein et al., "Adaptive Query Processing: Technology in Evolution", IEEE Data Engineering Bulletin, Jun. 2000.

P. Haas et al., "Ripple Joins for Online Aggregation", SIGMOD Conf. 1999, pp. 287–298.

J. Hellerstein et al., "Online Aggregation", SIGMOD Conf. 1997, pp. 171–182.

Helmer et al., "Evaluation of Main Memory Join Algorithms for Joins with Set Comparison Join Predicates", VLDB 1997, pp. 386–395.

Z. Ives et al., "An Adaptive Query Execution System for Data Integration", SIGMOD Conf. 1999, pp. 299–310.

J. Naughton et al., "The Niagara Internet Query System", submitted for publication, 2000.

F. Olken, "Random Sampling from Databases", Ph.D. Dissertation, UC Berkeley, Apr. 1993, available as Tech. Report LBL–32883, Lawrence Berkeley Laboratories.

H. Pang et al., "Partially Preemptible Hash Joins", SIGMOD Conf. 1993, pp. 59–68.

H. Pang et al., "Memory–Adaptive External Sorting ", VLDB 1993, pp. 618–629.

V. Raman et al., "Online Dynamic Reordering for Interactive Data Processing", VLDB 1999.

D. Schneider et al., "A Performance Evaluation of Four Parallel Join Algorithms in a Shared–Nothing Multiprocessor Environment", SIGMOD Conf. 1992, pp. 110–121.

A. Shatdal et al., "Adaptive Parallel Aggregation Algorithms", SIGMOD Conf. 1995, pp. 104–114.

K. Tan et al., "Online Feedback for Nested Aggregate Queries with Multi–Threading", VLDB 1999, pp. 18–29.

T. Urhan et al., "XJoin: Getting Fast Answers from Slow and Bursty Networks", Technical Report, CS–TR–3994, UMI-ACS–TR–99–13, Feb. 1999.

* cited by examiner

SECOND STAGE (CONT.)

MP$_{Bj}$ BECAME FULL BEFORE MP$_{Aj}$ BECAME FULL:

BEFORE MP$_{Aj}$ BECOMES FULL:

AFTER MP$_{Aj}$ BECOMES FULL:

FIG. 10A
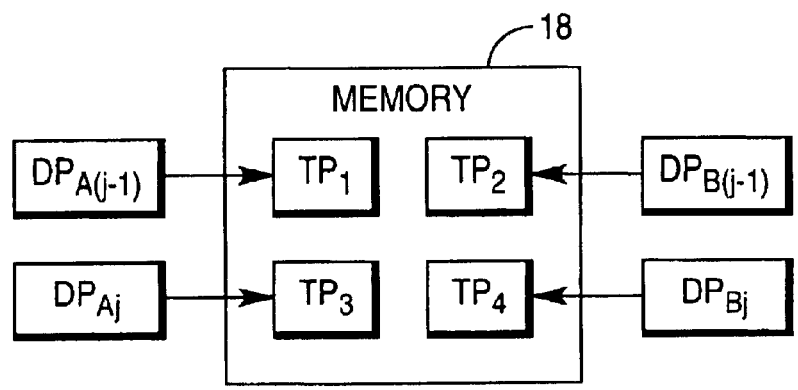
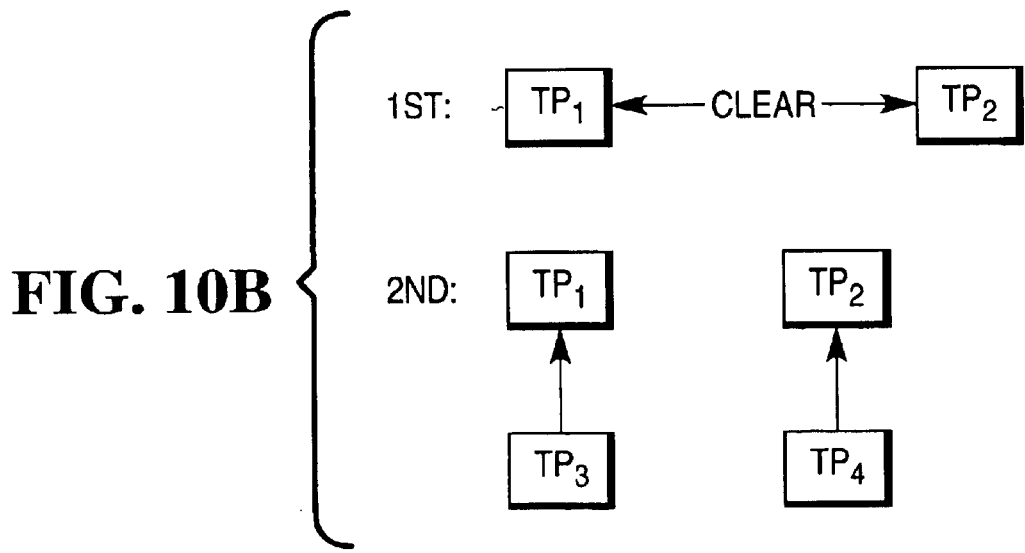
FIG. 10B

THIRD STAGE $MP_{Aj}$ BECAME FULL BEFORE $MP_{Bj}$ BECAME FULL IN BUCKET $B_{AB}$:

STEP 1:

STEP 2:

THIRD STAGE (CONT.)

$MP_{Aj}$ BECAME FULL BEFORE $MP_{Bj}$ BECAME FULL IN BUCKET $B_{AB}$:

STEP 3:

ALL THREE STEPS OF 3RD STAGE COMBINED:

THIRD STAGE $MP_{Bj}$ BECAME FULL BEFORE $MP_{Aj}$ BECAME FULL IN BUCKET $B_{AB}$:

STEP 1:

STEP 2:

THIRD STAGE (CONT.)

$MP_{Bj}$ BECAME FULL BEFORE $MP_{Aj}$ BECAME FULL IN BUCKET $B_{AB}$:

STEP 3:

ALL THREE STEPS OF 3RD STAGE COMBINED:

NON-BLOCKING PARALLEL BAND JOIN ALGORITHM

BACKGROUND

Relational databases are used for storage and retrieval of information. The information is structured in the database as two-dimensional tables of rows and columns. A column heading designates the type of data stored in each column. The information is stored in a non-volatile medium such as a disk array.

Users may access the database information typically by using database management software. The database storage media and management software together comprise a database management system, or DBMS. DBMSs may be implemented on a centralized mainframe system, or may be distributed in a client-server network, as examples.

The database management software includes specialized commands for accessing the database information. For example, a common command for accessing data is a Structured Query Language (SQL) "select" query. Using the select query, one or more rows from one or more tables of the database may be retrieved.

Traditionally, DBMSs processed queries in batch mode. In other words, a user wanting to extract information from the database would submit a query, wait a long time during which no feedback is provided, and then receive a precise answer.

Today, on-line aggregation and adaptive query processing present alternatives to traditional batch query processing. On-line aggregation permits progressively refined running aggregates of a query to be continuously displayed to the requesting user. The running aggregates, or intermediate results, are displayed typically along with a "confidence" factor. Adaptive query processing involves an iterative feedback process in which the DBMS receives information from its environment and uses the information to adapt the behavior of the query.

One area of optimization involves join operations. When queries involving multiple tables are made, a join operation may be performed. Upon receiving the multi-table query, tuples, or rows, from one table are joined with tuples from a second table, to produce a result. An equijoin is a type of join operation in which an entry, or column, of a tuple from one table has the same value as an entry of a tuple from a second table.

A band join is a non-equijoin of tuples of two tables in which the join condition is a range or band rather than an equality. Band joins may be useful in queries that involve real world domains, such as time, position, or price.

For example, suppose that a user of the DBMS wants to investigate the correlation between the situation of the stock market and important company events. Two tables, PRICE and NEWS, are involved. Tuples of PRICE represent the oscillation of stocks within a day, with attribute PRICE.C representing the time of the measurement in seconds. Tuples of NEWS represent financial news articles events, with attribute NEWS.D representing the time in seconds that the article was released.

Suppose the user wants to find all pairs of events occurring at nearly the same time, such that the first event represents a great oscillation of a stock within a day, and the second event represents a news event that mentions the company. Such a query may use a band join. The query may be written in SQL as:

SELECT PRICE.SYMBOL, NEWS.ARTICLE, PRICE.PERCENT_CHANGE
FROM PRICE, NEWS
WHERE PRICE.PERCENT_CHANGE>10
AND PRICE.C-NEWS.D<=300
AND PRICE.C-NEWS.D>=−300
AND NEWS.ARTICLE.CONTAINS (PRICE.SYMBOL)

One of the conditions uses a join operation, in which the difference between attribute, PRICE.C, and attribute, NEWS.D, is itself between −300 and 300. Tuples that meet the join criteria become part of the result table for the query.

There are two kinds of widely used traditional band join algorithms: the partitioned band join algorithm, which employs both a partitioning phase and a sorting phase, and the sort-merge band join algorithm, which employs a sorting phase and several merging phases. Both of these band join algorithms generate no results before the final phase. Thus, these types of band join algorithms are "blocking," and, thus, are inappropriate for on-line aggregation and adaptive query processing. If, instead, users of the DBMS receive an approximation of the final results during processing, the query may, in some cases, be aborted, long before its completion.

SUMMARY

In accordance with the embodiments described herein, a method and apparatus are disclosed in which first tuples are stored in a first table in a database system, second tuples are stored in a second table in the database system, the first and second tuples are partitioned into plural portions, and the first and second tuples are joined based upon the partitioning portions.

In other embodiments, the selection of any first tuple to be joined with any second tuple is random. In still other embodiments, result tuples are available after performing only a single join operation.

Other features and embodiments will become apparent from the following description, from the drawings, and from the claims.

BRIEF DESCRIPTION OF THE DRAWINGS

FIGS. 10A and 10B are block diagrams of temporary locations used by the adaptive symmetric band join algorithm according to one embodiment of the invention;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

On-line aggregation is distinguishable from traditional batch processing in that intermediate results are quickly displayed and continuously updated to the user. Where batch processing produces a final answer, usually after a long wait, on-line aggregation produces intermediate results based on a sampling of the database. Ideally, the intermediate results proceed toward the final answer, with each iteration, thus, giving the user a "sense" of the query result, without having to wait for the final result.

Obtaining intermediate results that proceed toward the final answer occurs when the samples are retrieved from the database at random. Random samples tend to produce successively more precise answers as more tuples are processed.

Another consideration when performing query processing is resource-related. A typical database query involving a join operation may involve retrieving thousands or even millions of tuples. Each tuple is stored in a stable, non-volatile location, such as a disk drive. The tuple is typically retrieved to a volatile location, such as a memory, during query processing. The available memory may limit the number of tuples loaded at a time.

A join operation involves comparisons between tuples of two different tables. Whether the join is an equijoin or a band join, each tuple of each table is compared to each tuple of the other table. Once a tuple from a first table is retrieved to memory, a join operation may be processed between the tuple and all tuples from a second table.

If the tuple is to be processed in its entirety, both the first tuple and all tuples from the second table are in memory. If fewer tuples are actually loaded in memory, the tuple may be retrieved a second time from disk. Join processing thus involves tradeoffs between available memory and the amount of disk access that occurs.

Figure 1A:
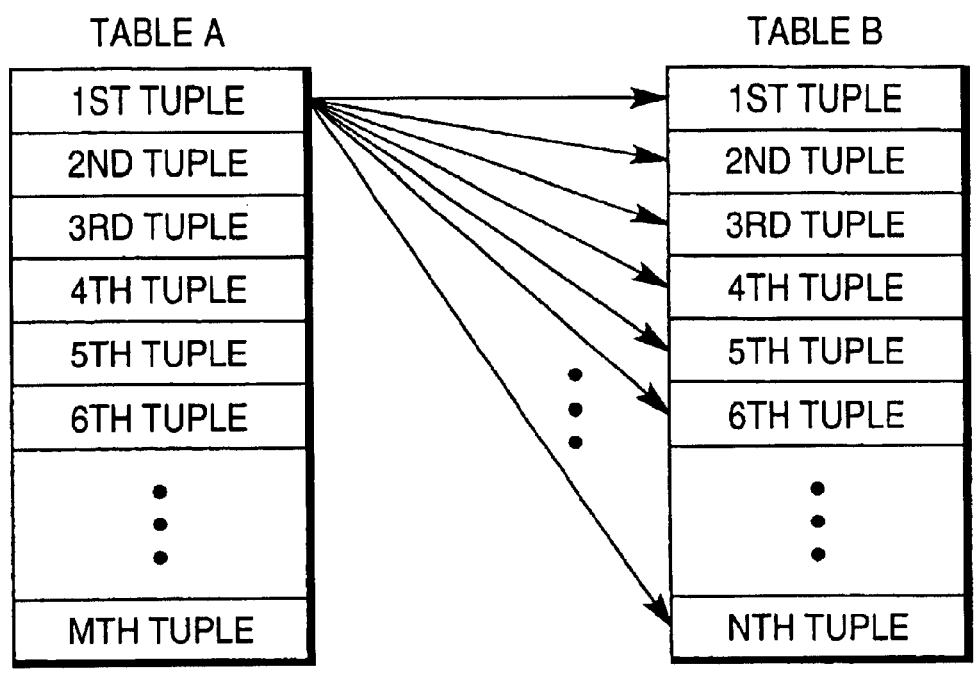
FIGS. 1A and 1B are block diagrams illustrating a sequential join operation according to one embodiment of the invention.

For example, in FIG. 1A, a first table, table A, includes M tuples, or rows, while a second table, table B, includes N tuples. (Ignore, for the moment, the fact that the tables may be distributed across multiple nodes in a parallel RDBMS.) To perform a join operation between tables A and B, each tuple of table A is compared with each tuple of table B.

The join operation may be performed sequentially, as depicted in FIG. 1A. The first tuple of table A is compared with each tuple of table B, one after the other. The first tuple of table A is compared with the first tuple of table B, then the second tuple of table B, and so on, as shown, until the Nth (final) tuple of table B is processed.

Figure 1B:
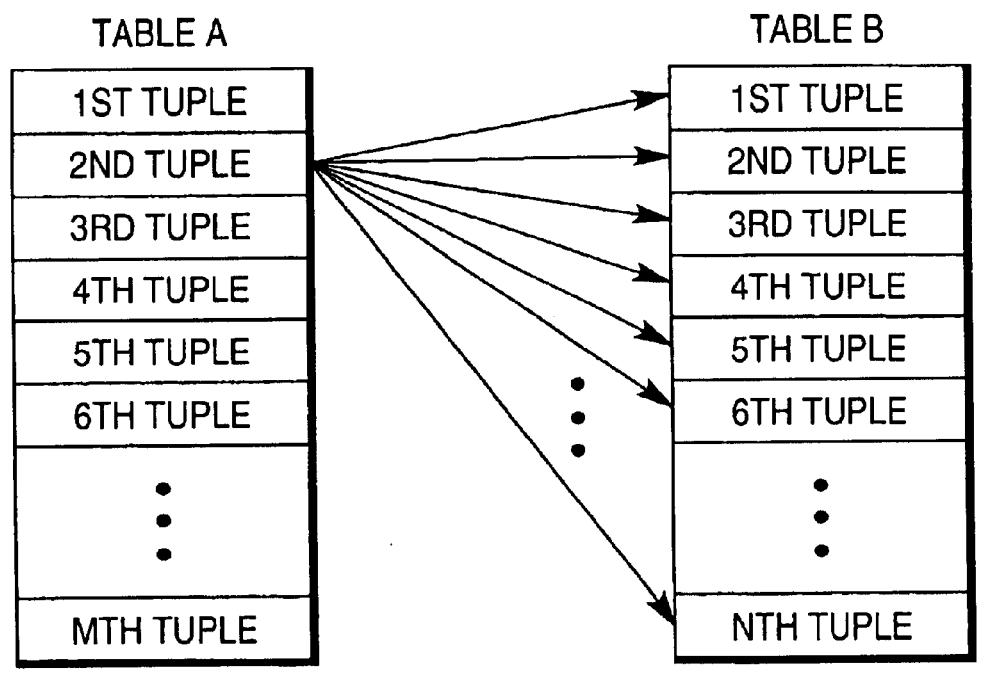

Then, as illustrated in FIG. 1B, the second tuple of table A is compared with each tuple of table B in turn. The second tuple of table A is compared with the first tuple of table B, then with the second tuple of table B, and so on, until the Nth tuple of table B. The process continues until the Mth (final) tuple of table A is compared to each of the N tuples of table B.

Such an algorithm is neither efficient in terms of resource allocation nor random. Since all the tuples of table B are processed for each tuple of table A, at least N+1 tuples of memory storage are used. (Recall that the tables may each include thousands or millions of tuples.) The process is not random because all the tuples of table B are processed for each tuple of table A, an inherent bias toward table B. Plus, the tuples for each table may or may not be in random order, which further negates the randomness of the process.

Non-blocking Parallel Band Join Algorithm

The join processing illustrated in FIGS. 1A and 1B is thus not possible for on-line aggregation and adaptive query processing. Instead, according to one embodiment, a non-blocking parallel band algorithm is used for band joins. The algorithm is symmetric because the tables to be joined are treated the same. No preference for one table over the other is made during processing.

The algorithm is adaptive because memory consumption is adjusted based on available resources and characteristics of each table. In one embodiment, more memory space is dynamically allocated to reduce disk input/outputs (I/Os). The tuples are partitioned such that join processing need be performed only between adjacent partitions. As many tuples as possible for each partition are kept in memory. If the memory overflows, the entire unjoined partition of tuples is written to disk. This leads to relatively good performance, especially in the case where the query is not terminated prior to completion.

The non-blocking parallel band join algorithm is non-blocking (e.g., meaningful intermediate results are produced), even when memory overflow occurs. In one embodiment, the algorithm generates result tuples for the join operation in a random order, as is typical for on-line aggregation and adaptive query processing.

The algorithm operates in two phases, an in-memory phase and a disk phase. In one embodiment, the order in which join result tuples are generated is random for the in-memory phase and nearly random for the disk phase.

The non-blocking parallel band join algorithm may be implemented in either a single-processor database system or in a multi-processor, parallel database system. The algorithm may be used for on-line aggregation or adaptive query processing in very large distributed databases, for example.

Operating Environment

Figure 2:
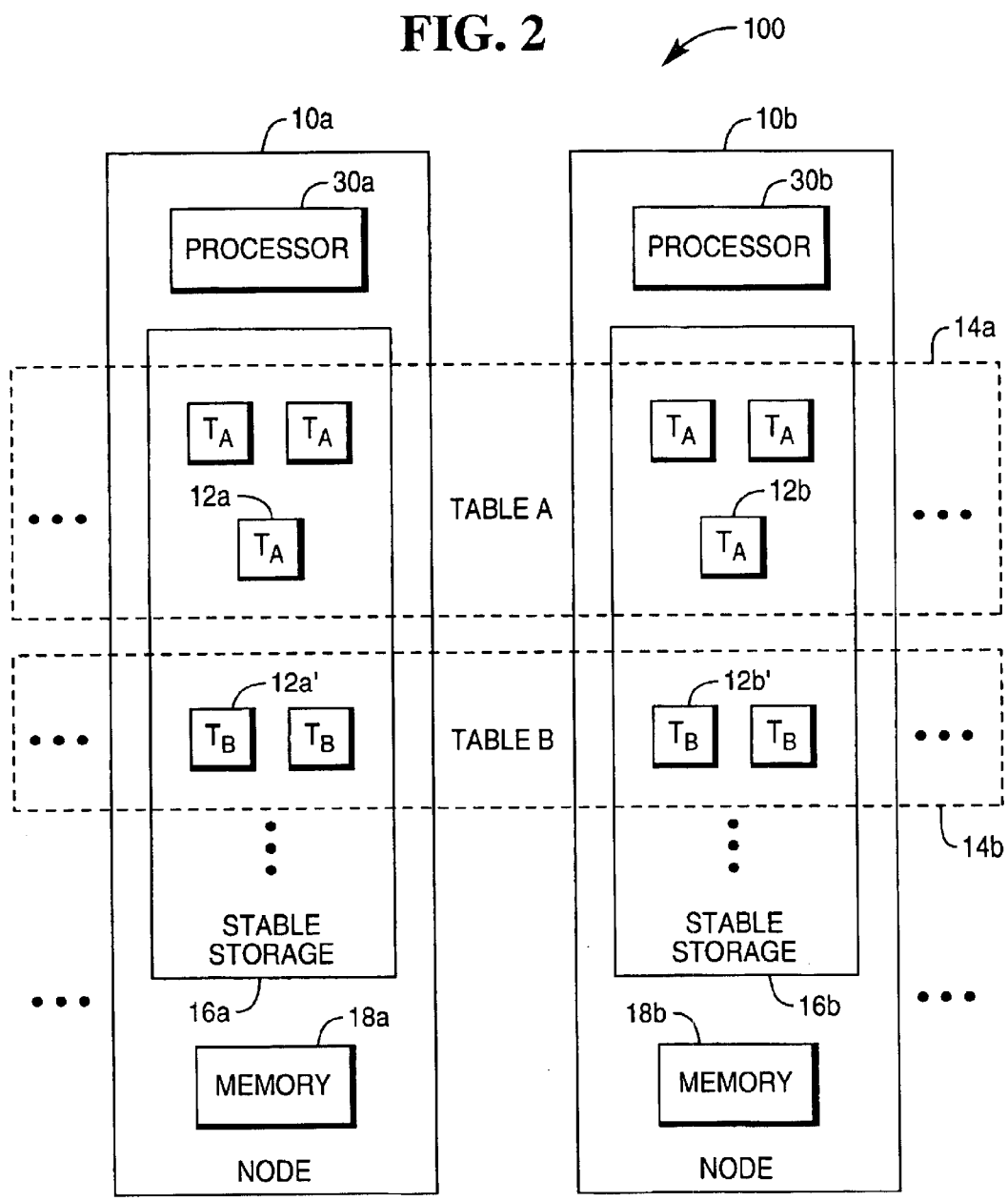
FIG. 2 is a block diagram of a parallel RDBMS according to one embodiment of the invention.

In FIG. 2, a parallel relational database management system 100, or parallel RDBMS, according to one example, includes a plurality of nodes 10. Two nodes 10a and 10b of the plurality of nodes 10 are depicted. Each node 10 includes a processor 30, for executing application programs, such as database management software.

A first table 14, called table A, includes tuples 12, also known as rows, in which the tuples are distributed on the two nodes 10a and 10b. Tuples 12a of table A ($T_A$) are found on one node 10a, while the remaining tuples 12b of table A are found on another node 10b. Likewise, a second table 14, called table B, includes tuples 12' ($T_B$) are also distributed on at least two nodes 10a and 10b. One set of tuples 12a' of table B are on one node 10a while the remaining tuples 12b' of table B are on another node 10b.

Both tables 14 may have additional tuples 12, distributed to additional nodes 10 of the parallel RDBMS 100. In one embodiment, the tuples 12 of each table 14 are distributed, as evenly as possible, across all the nodes 10 of the parallel RDBMS 100. In one embodiment, the tuples 12 for each node 10 are located in a stable storage 16, such as a hard disk drive or other non-volatile medium. Each node 10 additionally includes a memory 18, to which the tuples 12 may be transferred, such as during a join or other query processing operation.

Sample Query Involving Join Operation

In the following example SQL query, a band join between two tables, A and B, is performed:

SELECT ONLINE A.e, avg(B.z)
FROM A, B
WHERE $-c_1 \leq$ A.c$-$B.x
AND A.c$-$B.x$\leq c_2$
GROUP BY A.e A.c and B.x are attributes of the table A and B, respectively, in which A.c is from column c of table A and B.x is from column x of table B. The query constructs an "online" average of attribute B.z (i.e., column z of table B) grouped by A.e (i.e., column e of table A) for those rows of table A where the difference between A.c and B.x are between constants $-c_1$ and $c_2$. Online, as used here, means generating the result tuples continuously. A "result table" is a two-column table, including column e of table A and the average of column z of table B. To calculate the difference between the attributes, A.c and B.x, a join operation is performed.

Figure 3:
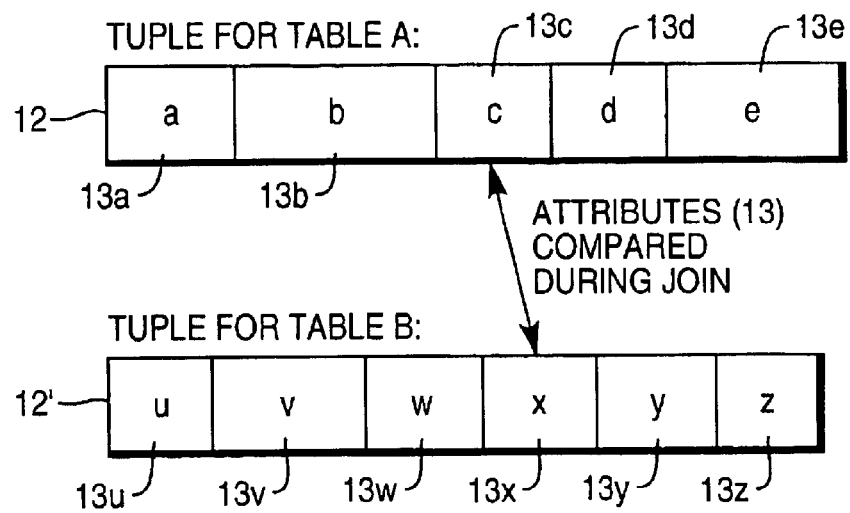
FIG. 3 is a block diagram of join tuples with attributes according to one embodiment of the invention.

The tuples 12 for table A and table B are illustrated in FIG. 3, according to one example. The tuple 12 for table A ($T_A$) includes several attributes 13, denoted a, b, c, d, and e. The tuple 12' for table B ($T_B$) includes similar attributes 13, denoted u, v, w, x, y, and z. In the example join operation, the attribute c of tuple 12 is compared to the attribute x of tuple 12', as illustrated by the double-sided arrow.

Redistribution of Tuples

Originally, tuples, or rows, of tables A and B are stored at the nodes according to some partitioning strategy, such as hash partitioning, range partitioning, or round-robin partitioning. The partitioning strategy typically attempts to distribute the tuples for a given table evenly across all available nodes of the relational database.

According to one embodiment, the non-blocking parallel band join algorithm re-partitions the tuples 12. The tuples 12 are partitioned such that the tuples 12 for which the attributes 13 being compared during the join operation (e.g., A.c or B.x) are close in value end up on the same node 10. The tuples 12 for each table 14 are thus redistributed to the nodes 10 to "localize" the join processing.

Recall that the join operation involves comparing tuples of two tables. In one embodiment, the non-blocking parallel band join algorithm partitions one of the tables such that each tuple of the table ends up on a single node. The algorithm partitions the other of the tables such that some of its tuples end up on two nodes. The tuples that end up on two nodes are tuples whose attributes are at the edge of the partition, according to the partitioning strategy described below.

Figure 4:
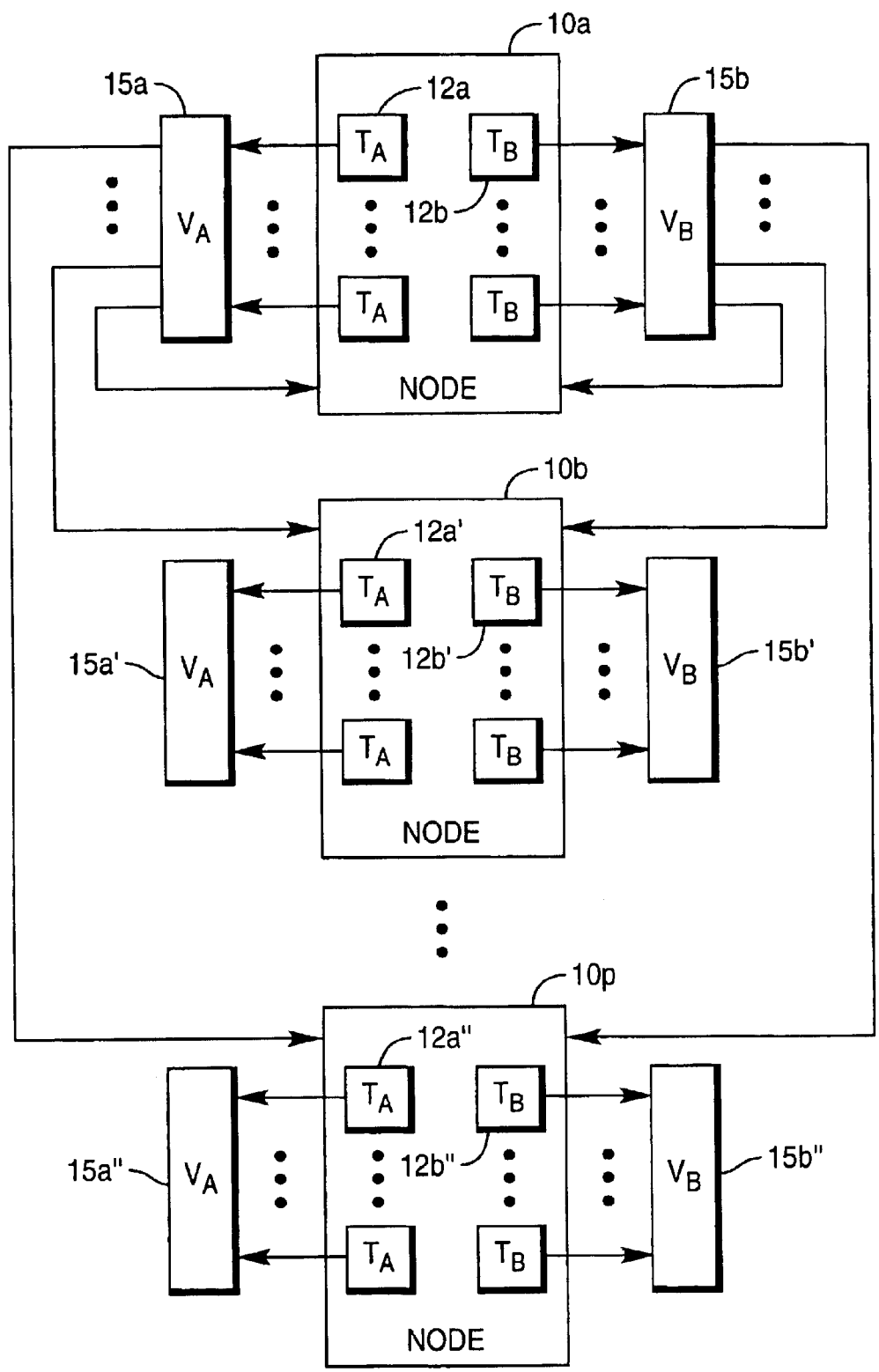
FIG. 4 is a block diagram of split vector operation according to one embodiment of the invention.

In one embodiment, for each table 14, a split vector 15 partitions the tuples 12, as illustrated in FIG. 4. For a join operation involving table A and table B, for example, split vectors 15a and 15b, or $V_A$ and $V_B$, respectively, are generated.

The split vectors perform range partitioning, according to one embodiment, such that tuples 12 with similarly valued attributes, within a range designated by the split vector 15, end up on the same node 10. In one embodiment, the split vectors $V_A$ and $V_B$ are chosen by sampling or by using histograms to ensure that each node 10 has roughly the same work load.

In one embodiment, the split vectors 15 operate upon the attribute 13. Based on the attribute value, the split vectors 15 divide the tuples 12 into ranges. The tuples 12 are redistributed onto the various nodes 10 according to these ranges.

Referring to the band join query introduced above, assume that the attributes A.c and B.x fall between the values (l, h). In other words, all possible values in column c of tuples 12 for table A and all possible values in column x of tuples 12 for table B are between l and h. Further, assume that there are L total nodes 10 in the parallel RDBMS 100. Then L+1 values $v_0, v_1, \ldots,$ and $v_L$ may be chosen, such that $$l=v_0<v_1<\ldots<v_{L-1}<v_L=h.$$

According to one embodiment, split vectors $V_A$ and $V_B$ are constructed from the L+1 values, above.

For example, split vector $V_A$ includes the elements:

$$V_A=[v_0, v_1), [v_1, v_2), \ldots, [V_{L-1}, V_L]$$

A "[" or "]" symbol indicates that the value $v_i$ is inclusive in the range, while the ")" symbol indicates that the value $v_i$ is not inclusive in the range. In one embodiment, the tuples 12a of table A ($T_A$) are partitioned into ranges described by the split vector $V_A$. These tuples are then distributed to all nodes 10 of the parallel RDBMS 100.

The elements of the split vector $V_B$ additionally use the range values of the original SQL query $c_1$ and $c_2$. In one embodiment, the split vector $V_B$ for table B is as follows:

$$V_B=[v_0, v_1+c_1), [v_1-c_2, v_2+c_1), \ldots, [v_{L-1}-c_2, V_L]$$

In one embodiment, the tuples 12b of table B ($T_B$) are partitioned according to the split vector $V_B$. Likewise, tuples 12b', located on node 10b, may be partitioned according to the split vector $V_B$.

In one embodiment, range values for the split vector $V_B$ includes some overlap. Recall that the original join query is looking for tuples in which $T_A.c-T_B.x$ is between $-c_1$ and $c_2$. Because the ranges for split vector $V_B$ overlap, some tuples $T_B$ may go to two nodes. However, split vector $V_A$ does not overlap, so tuples $T_A$ go to a single node. Thus, as between tuples $T_A$ and $T_B$, a single join result tuple will be computed.

In FIG. 4, only operation of the split vectors 15a and 15b ($V_A$ and $V_B$, respectively) for node 10a are depicted, to simplify the illustration. According to the split vector $V_A$, tuples $T_A$ are redistributed to node 10a, node 10b, ..., and node 10p. Tuples $T_B$ are redistributed to node 10a, node 10b, ..., and node 10p, using split vector, $V_B$.

Split vectors 15a' and 15b' ($V_A$ and $V_B$, respectively) for node 10b likewise redistribute tuples 12a' and 12b', to the nodes 10a, 10b, ..., and 10p. Split vectors 15a" and 15b" ($V_A$ and $V_B$, respectively) for node 10p redistribute tuples 12a" and 12b", to the nodes 10a, 10b, ..., and 10p.

Suppose that L=4, i.e., there are four nodes and $c_1$=2, $c_2$=3, l=0, and h=400. According to the strategy outlined above, the tuples 12 of table A may be partitioned, using split vector $V_A$ into ranges [0, 100), [100, 200), [200, 300), and [300, 400]. Likewise, the tuples 12 of table B may be partitioned into ranges, according to split vector $V_B$, or [0, 102), [97, 202), [197, 302), and [297, 400].

Thus, a first node 10a would include tuples from table A in which attribute A.c has a value between 0 and 100 and tuples from table B in which attribute B.x has a value between 0 and 102. A second node 10b would include tuples from table A in which attribute A.c has a value between 100 and 200 and tuples from table B in which attribute B.x has a value between 97 and 202, and so on.

Due to the overlap of the ranges in $V_B$, some tuples 12 of table B are redistributed onto multiple nodes 10. In the model just provided, for example, a tuple 12 with an attribute 13 with value 100 would be distributed to both the first node 10a and the second node 10b, according to split vector $V_B$. However, in one embodiment, where the bandwidth $c_1+c_2$ (e.g., 5) is small enough, no tuple 12 of table B is redistributed onto more than two nodes 10. Although a small $c_1+c_2$ value enables a more efficient execution of the band join algorithm, according to one embodiment, such embodiments may also be used for large $c_1+c_2$ values.

Non-blocking Parallel Band Join Algorithm

Once the split vectors $V_A$ and $V_B$ are created, a non-blocking parallel band join algorithm simultaneously performs operations on each node 10 using multi-threading. These operations are depicted in FIG. 5, according to one embodiment.

For each table 14 that includes tuples 12 in its node 10, the tuples 12 are received from stable storage 16 and written into memory 18 (block 202). Then, as described above, a split vector for the table 14 is used to redistribute the tuples 12 to all the nodes 10 that are part of the parallel RDBMS 100 (block 204). In one embodiment, the tuples 12 are distributed evenly across all nodes 10 of the parallel RDBMS 100. Once redistributed, the tuples 12 are joined using the adaptive symmetric band join algorithm, as described below (block 206).

Figure 5:
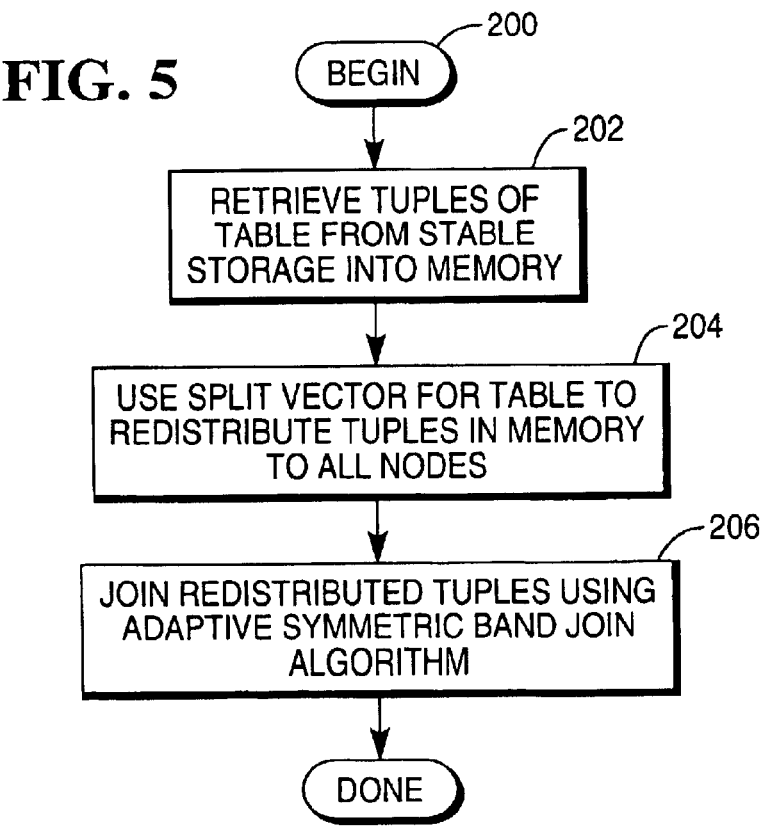
FIG. 5 is a flow diagram of the non-blocking parallel band join algorithm according to one embodiment of the invention.

The operations of FIG. 5 are independently and simultaneously performed for both tables A and B of the join operation. When the tuples 12 of tables A and B are redistributed according to the split vectors $V_A$ and $V_B$, respectively, the adaptive symmetric band join algorithm may be implemented.

Bucket Tables

According to the redistribution strategy described above, each node 10 receives tuples 12 from each of tables A and B, one after another. Since the tuples 12 are used for the join operation, the join operation may be performed as the tuples 12 arrive at the node.

Figure 6:
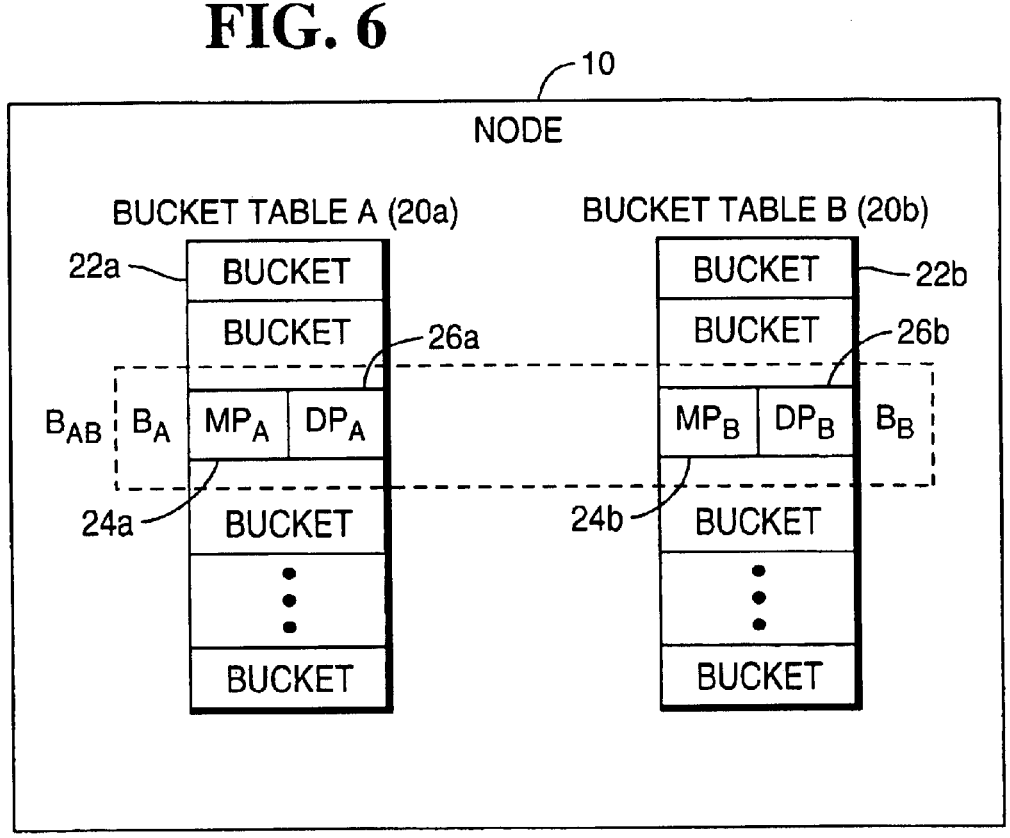
FIG. 6 is a block diagram of bucket tables on a node according to one embodiment of the invention.

The incoming tuples 12 are thus arranged to facilitate the join operation, according to one embodiment. Each node 10 of the parallel RDBMS 100 includes a bucket table for receiving the tuples 12. The bucket table is associated with the attributes 13 of each table 14. Two bucket tables 20, one for table A and one for table B, are found in each node 10, as illustrated in FIG. 6.

The bucket table 20 is essentially a data structure, used to maintain the tuples 12 during the join operation. Bucket table A is allocated for table A; bucket table B is allocated for table B.

Each bucket table 20 includes several buckets 22. The buckets 22 represent yet another partitioning of the tuples 12 for the table 14. To each node 10, a portion or subset of all tuples 12 of each table 14 is streamed, as defined by the split vector 15. As a sorting scheme for the incoming tuples, the bucket table 20 further divides the tuples 12 on the node 10 using buckets 22. Each bucket 22 holds tuples 12 in which a designated attribute 13 is between a range of values.

In one embodiment, the buckets $B_A$ ($B_B$) each include both a memory-resident part 24 $MP_A$ ($MP_B$) and a disk-resident part $DP_A$ ($DP_B$). The memory-resident part $MP_A$ ($MP_B$) of the bucket $B_A$ ($B_B$) occupies a portion of the memory 18 while the disk-resident part 26 $DP_A$ ($DP_B$) occupies a portion of the stable storage 16 (see FIG. 2).

In FIG. 6, the node 10 includes bucket table A (20a) for table A and bucket table B (20b) for table B. Likewise, other nodes 10 that include tuples 12 for tables A and B include bucket tables 20 for each table 14.

For example, at the $i^{th}$ node 10, the range of the values that A.c can take is $[v_{i-1}, v_i)$, or $[v_{L-1}, v_L]$ for the last ($L^{th}$) node 10. Suppose there are M buckets 22 in each bucket table 20. Then, M+1 values $w_0, w_1, \ldots$ and $W_M$, are used, such that:

$$v_{i-1}=w_0<w_1<\ldots<w_{M-1}<w_M=v_i$$

In one embodiment, the bucket table $BT_A$ may be described as follows:

$$\{[w_0,w_1), [w_1,w_2), \ldots, [w_{M-2},w_{M-1}), [w_{M-1},w_M]\}$$

where each element describes the range of values for a different bucket 22 of the bucket table 20a. Likewise, bucket table $BT_B$ may be described as follows:

$$\{[w_0-c_2,w_1), [w_1,w_2), \ldots, [w_{M-2},w_{M-1}), [w_{M-1},w_M+c_1]\}$$

where each element describes the range of values for a different bucket 22 of the bucket table 20b.

For example, in the illustration above, the first node 10a includes redistributed tuples from table A in which attribute A.c has a value between 0 and 100, i.e., $[v_0, v_1)$. Accordingly, the range of the values that A.c can take is [0, 100). Assume that M=10. Thus, bucket table A may include ten buckets 22, wherein the first bucket 22 includes tuples from table A in which attribute A.c has a value between 0 and 10; the second bucket 22 includes tuples in which attribute A.c has a value between 11 and 20; and the last bucket 22 includes tuples in which attribute A.c has a value between 91 and 100.

Likewise, where $c_1=2$ and $c_2=3$, bucket table B may include ten buckets 22, wherein the first bucket 22 includes tuples from table B in which attribute B.x has a value between −2 and 10; the second bucket 22 includes tuples in which attribute B.x has a value between 11 and 20; and the last bucket 22 includes tuples in which attribute B.x has a value between 91 and 102. In one embodiment, the buckets 22 are partitioned so that, on each node 10, a redistributed tuple 12 is stored in only one bucket.

Figure 7:
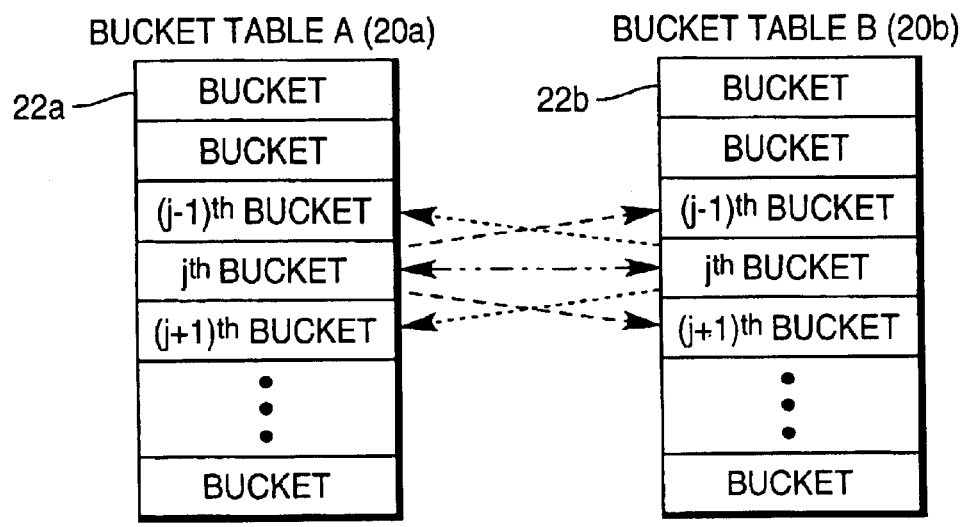
FIG. 7 is a block diagram of join operations between adjacent buckets according to one embodiment of the invention.

In FIG. 7, according to one embodiment, bucket table A (20a) and bucket table B (20b) include a plurality of buckets 22. FIG. 7 illustrates how the tuples 12 of the tables 14 may be band joined, according to one embodiment.

Recall that the range partitioning operation performed using the split vectors $V_A$ and $V_B$ cause tuples 12 that need to be joined to end up on the same node 10. Likewise, the tuples 12 are further partitioned into buckets 22 such that bucket pair $B_{AB}$ including buckets $B_A$ and $B_B$ receive tuples $T_A$ and $T_B$ according to the attributes A.c and B.x, respectively.

In one embodiment, the bandwidth $c_1+c_2$ is sufficiently small that tuples 12a of table A that are to be joined with tuples 12b of table B are within a bucket 22 of one another. In other words, tuples in the $j^{th}$ bucket of table A $B_{Aj}$ are joined with tuples in the $(j-1)^{th}$, $j^{th}$, and $(j+1)^{th}$ buckets of table B, $B_{B(j-1)}$, $B_{Bj}$, and $B_{B(j+1)}$, respectively.

Accordingly, as depicted in FIG. 7, when the $j^{th}$ bucket 22a of bucket table A is to be band joined with buckets 22b of bucket table B, three buckets 22b of bucket table B are joined: the $(j-1)^{th}$ bucket, the $j^{th}$ bucket, and the $(j+1)^{th}$ bucket (see the dashed arrows). Likewise, when the $j^{th}$ bucket 22b of bucket table B is to be band joined with buckets 22a of bucket table A, three buckets 22a of bucket table A are joined: the $(j-1)^{th}$ bucket, the $j^{th}$ bucket, and the $(j+1)^{th}$ bucket (see the dotted arrows).

Looking back to FIG. 6, a dotted rectangle encloses bucket $B_A$ of bucket table A and bucket $B_B$ of bucket table B. The $j^{th}$ bucket $B_{Aj}$ and the $j^{th}$ bucket $B_{Bj}$ are referred to as the $j^{th}$ bucket pair $B_{ABj}$. Some parts of the algorithm operate on buckets $B_{Aj}$, and $B_{Bj}$ individually, while other parts operate on bucket pairs $B_{ABj}$.

Adaptive Symmetric Band Join Algorithm

In one embodiment, the adaptive symmetric band join algorithm, which is performed at each node 10 of the parallel RDBMS 100, includes three stages. In the first stage, the redistributed tuples 12 are received by the node 10, then join operations are performed, as many as possible, while the tuples 12 are in memory.

The second stage is triggered when one of the memory parts allocated for the buckets has grown to a predetermined size limit. Transfers to stable storage occur. Join operations between tuples in both memory parts $MP_A$ ($MP_B$) and disk parts $DP_A$ ($DP_B$) of the buckets $B_A$ ($B_B$) also occur, according to one embodiment. Once all tuples 12 have been redistributed to the node 10, the third stage performs all joins that were not performed in the first and second stages.

First Stage—Joining Redistributed Tuples Using Available Memory

In the first stage of the algorithm, the tuples 12 are being redistributed to the nodes 10 according to the split vectors $V_A$ and $V_B$ then are arranged in buckets 22 according to the arrangement described above. The tuples 12 are initially loaded into the memory parts $MP_A$ and $MP_B$ of bucket tables A and B, respectively. Accordingly, as many memory-to-memory join operations are performed, as the tuples 12 are received by the node 10.

In one example, as tuples $T_A$ ($T_B$) are received into $MP_A$ ($MP_B$), the tuples are kept in sorted order, according to A.c (B.x). By keeping the tuples $T_A$ ($T_B$) in $MP_A$ ($MP_B$) in sorted order, the tuples may more efficiently be retrieved during the join operations. The join operation may thus perform much more quickly, in one embodiment.

In the first stage, the buckets 22 process the incoming tuples 12 independently. That is, bucket 22a from bucket table 20a processes tuples 12 for table A while bucket 22b from bucket table 20b processes tuples 12' for table B. Likewise, each bucket 22 of each bucket table 20 is processed independently from each other bucket 22 of the table 20.

Figure 8:
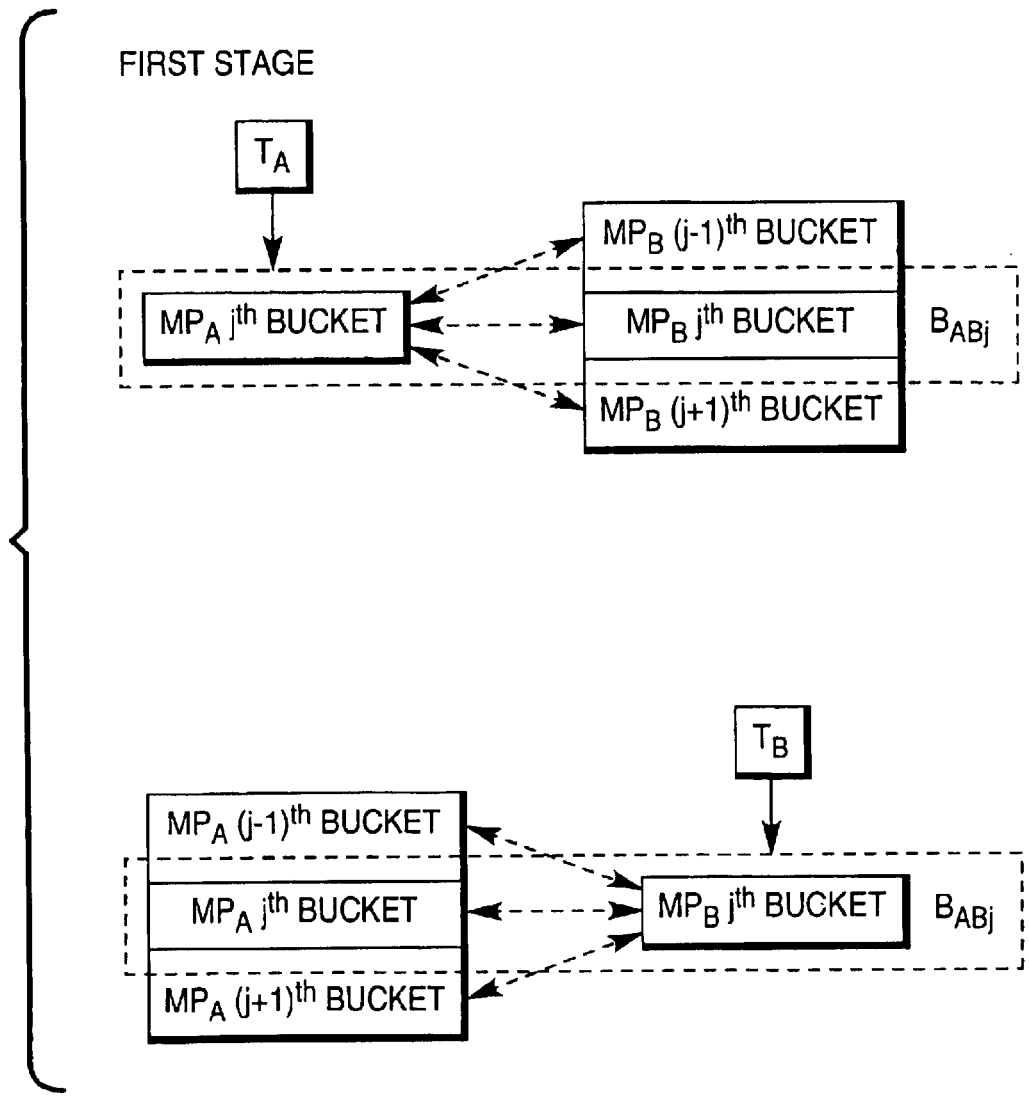
FIG. 8 is a block diagram of the first stage of the adaptive symmetric band join algorithm according to one embodiment of the invention.

The first stage is illustrated in FIG. 8, according to one embodiment. As a tuple $T_A$ is redistributed to the node 10 (according to the split vector, $V_A$), the appropriate bucket pair $B_{ABj}$ is identified. In one embodiment, a binary search is performed to quickly arrive at the bucket pair $B_{ABj}$. At first, all tuples 12 are received into a memory part, MP, as each bucket 22 includes storage for at least one tuple 12.

As FIG. 8 shows, the tuple $T_A$ is inserted into $MP_A$, then joined with the memory part for the $j^{th}$ bucket of table B, as well as the two adjacent buckets 22 of table B, the $(j-1)^{th}$ and the $(j+1)^{th}$ buckets. In other words, each time a tuple $T_A$ arrives at the memory part of the $j^{th}$ bucket $MP_{Aj}$ the tuple $T_A$ is joined with all the tuples in $MP_{B(j-1)}$, $MP_{Bj}$, and $MP_{B(j+1)}$. Recall that each part ($MP_{B(j-1)}$, $MP_{Bj}$, and $MP_{B(j+1)}$) may include many tuples. Alternatively, where the parts ($MP_{B(j-1)}$, $MP_{Bj}$, and $MP_{B(j+1)}$) include no tuples, no join operations are performed.

Likewise, as the tuple $T_B$ arrives at the node, $T_B$ is inserted into $MP_B$, then joined with the memory part for the $j^{th}$ bucket of table A, as well as the two adjacent buckets 22 of table A, as also depicted in FIG. 8. In other words, each time a tuple $T_B$ arrives at the memory part of the $j^{th}$ bucket $MP_{Bj}$ the tuple $T_B$ is joined with all the tuples in $MP_{A(j-1)}$, $MP_{Aj}$, and $MP_{A(j+1)}$.

In one embodiment, the algorithm dynamically grows $MP_A$ and $MP_B$ as tuples $T_A$ and $T_B$, respectively, arrive at the node 10. The parallel RDBMS 100 allocates a certain amount of memory for each bucket 22 of each bucket table 20. However, at some point, the memory needed to store the incoming tuples 12 may exceed the memory allocation for one or more of the buckets 22.

In one embodiment, the memory parts for each bucket 22 may be dynamically adjusted. For example, for each $MP_{Aj}$ and $MP_{Bj}$, prior to becoming full, the memory amount may be increased, such as by allocating an additional memory page to the bucket 22. Likewise, memory pages may be dynamically removed, as desired. Or, a memory page may be moved from one bucket 22 to another. By dynamically adjusting the memory amounts during processing, the algorithm is partially memory adaptive and thus well-suited for multi-user real-time environments.

Second Stage—Joining Redistributed Tuples when Memory Overflows

When the memory part $MP_A$ ($MP_B$) is filled before the memory part $MP_B$ ($MP_A$) during the first stage (e.g., no more memory is available for that bucket 22), both bucket $B_A$ and $B_B$ are processed in a second stage, as bucket pair $B_{AB}$. Bucket pairs $B_{AB}$ may arrive at the second stage at different times. However, as in the first stage, the buckets $B_A$ and $B_B$ are processed independently, after arriving together at the second stage.

Figure 9A:
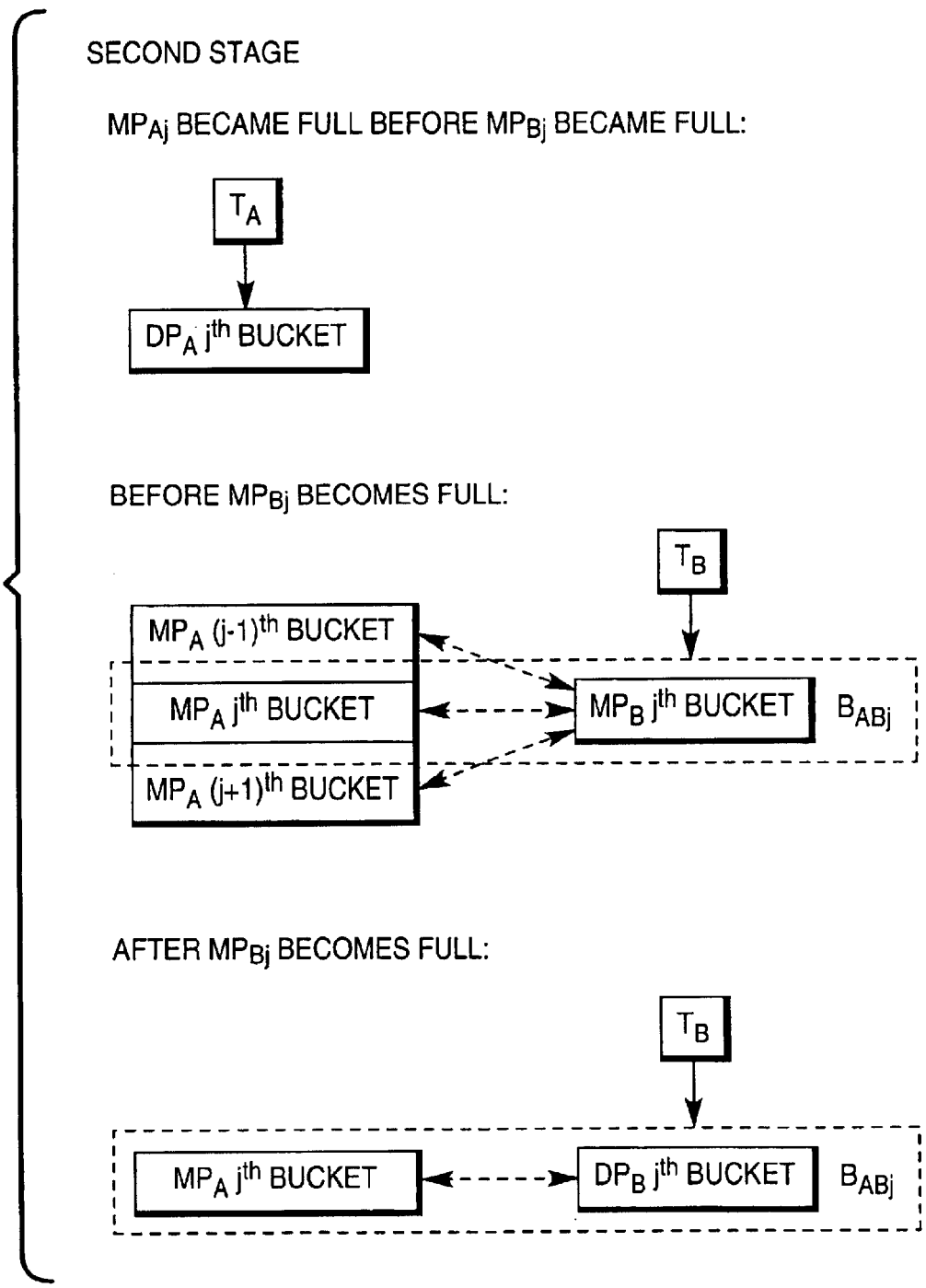
FIGS. 9A and 9B are block diagrams of the second stage of the adaptive symmetric band join algorithm according to one embodiment of the invention.

Accordingly, the memory overflow of either bucket $B_A$ or $B_B$ of bucket pair $B_{AB}$ causes the entire bucket pair $B_{AB}$ to proceed to the second stage, as illustrated in FIG. 9A. What happens in the second stage depends on which memory part was filled first, $MP_A$ or $MP_B$, during the first stage.

Where the memory part of bucket A ($MP_A$) filled first, e.g., before the memory part of bucket B ($MP_B$) all subsequent tuples $T_A$ received into the bucket pair $B_{ABj}$ are written to disk (i.e., stable storage 16). This occurs because of an overflow of the available memory for the bucket 22. In FIG. 9A each tuple $T_A$ is stored in $DP_{Aj}$, as shown.

For tuples $T_B$, however, the $MP_{Bj}$ did not overflow at the first stage. Accordingly, as long as $MP_{Bj}$ does not overflow, each incoming tuple $T_B$ is received into $MP_{Bj}$, then joined with all the tuples $T_A$ in the memory part $MP_{Aj}$, as well as in the memory parts for adjacent buckets $MP_{A(j-1)}$ and $MP_{A(j+1)}$, as depicted in FIG. 9A. As in the first stage, the redistributed tuples $T_B$ are kept in sorted order in $MP_{Bj}$, according to B.x, in one embodiment.

Once $MP_{Bj}$ becomes full, however, incoming tuples $T_B$ are joined with tuples $T_A$ in $MP_{Aj}$. The tuples $T_B$ are then sent to stable storage 16 or $DP_{Bj}$, as illustrated in FIG. 9A.

Figure 9B:
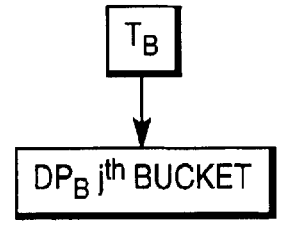
Figure 9B:
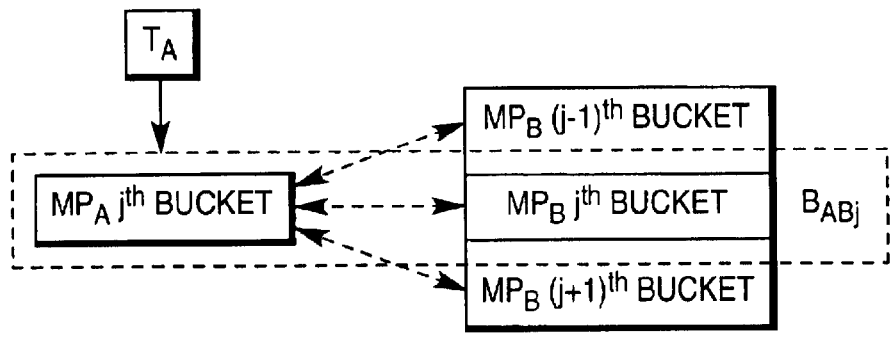
Figure 9B:
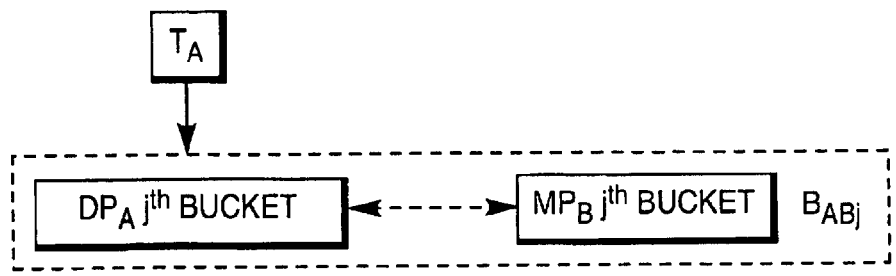

FIG. 9B shows the reverse, but symmetric, operations of the second stage, in which the memory part $MP_{Bj}$ became full before the memory part $MP_{Aj}$ became full in the first stage. No bucket pairs $B_{AB}$ enter the third stage of the algorithm until all bucket pairs have completed the second stage. Thus, all bucket pairs $B_{AB}$ enter the third stage at the same time.

Third Stage—Performing Remaining Join Operations (Tuples Are Redistributed)

In the third stage, according to one embodiment, bucket pairs $B_{AB}$ are processed, one-by-one, sequentially. The third stage essentially performs all join operations not performed in the first and second stages. Since bucket. pairs $B_{AB}$ are processed in sequence, one adjacent bucket pair is operated upon in the third stage, rather than both adjacent bucket pairs $B_{AB(j-1)}$ and $B_{AB(j+1)}$. In one embodiment, join operations between bucket pair $B_{ABj}$ and the previous bucket pair $B_{AB(j-1)}$ are performed.

Because many of the join operations involve disk parts, DP, a temporary storage in the memory 18 is allocated for performing join operations during the third stage.

Since there are two disk parts $DP_A$ and $DP_B$ for each bucket pair $B_{AB}$ and since the third stage operates on the $j^{th}$ bucket pair $B_{ABj}$ as well as. the $(j-1)^{th}$ bucket pair $B_{AB(j-1)}$ four temporary memory locations, $TP_1$, $TP_2$, $TP_3$, and $TP_4$, are allocated in the third stage, as shown in FIG. 10A.

According to one embodiment, when processing the $j^{th}$ bucket pair $B_{ABj}$ $TP_1$ and $TP_2$ have tuples 12 for the disk part of the $(j-1)^{th}$ bucket pair $DP_{A(j-1)}$ and $DP_{B(j-1)}$, respectively. Likewise, $TP_3$ and $TP_4$ have tuples 12 for the disk part of the $j^{th}$ bucket pair $DP_{Aj}$ and $DP_{Bj}$, respectively. In one embodiment, as in the first and second stages, the tuples $T_A$ ($T_B$) in the temporary memory locations are kept in sorted order, according to attribute A.c (B.x) for efficient retrieval during the join operations.

After processing each bucket pair $B_{ABj}$ two of the four temporary locations are emptied, as illustrated in FIG. 10B. $TP_1$ and $TP_2$, used to contain $DP_{A(j-1)}$ and $DP_{B(j-1)}$, are cleared, then the contents of $TP_3$ are moved to $TP_1$, the contents of $TP_4$ are moved to $TP_2$, according to one embodiment. Then, when a subsequent bucket pair $B_{AB(j+1)}$ is processed, $DP_{A(j+1)}$ and $DP_{B(j+1)}$ may be moved to $TP_3$ and $TP_4$, respectively, while $TP_1$ and $TP_2$ contain tuples of $DP_{Aj}$ and $DP_{Bj}$, respectively.

The third stage operation is depicted in FIGS. 11A–11D, according to one embodiment. Both the memory part 24 (MP) and the disk part 26 (DP) of tables A and B are included, for both the $j^{th}$ and the $(j-1)^{th}$ bucket pairs.

The third stage first determines whether, for bucket pair $B_{ABj}$ the memory part of table A ($MP_{Aj}$) or the memory part of table B ($MP_{Bj}$) became full first. FIGS. 11A–11D depict operations of the third stage in which $MP_{Aj}$ became full before $MP_{Bj}$ did.

Figure 11A:
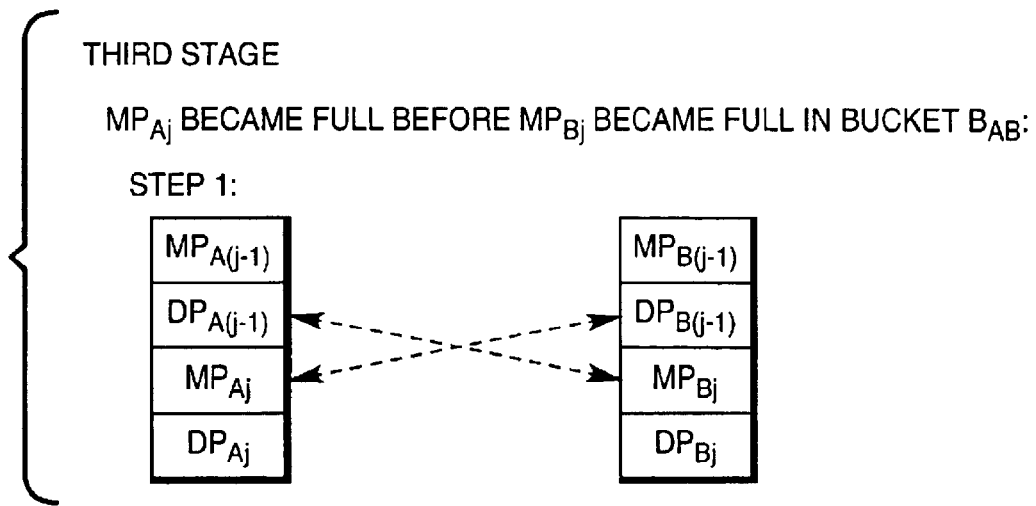
FIGS. 11A–11D are block diagrams of the third stage of the adaptive symmetric band join algorithm according to one embodiment of the invention.

In one embodiment, a first step of the third stage performs join operations between $MP_{Aj}$ and $DP_{B(j-1)}$ and between $MP_{Bj}$ and $DP_{A(j-1)}$, as shown in FIG. 11A. All tuples in each part are joined. Since the two join elements $MP_{Aj}$ and $MP_{Bj}$ are in memory, no temporary memory location need be allocated during these join operations.

Figure 11B:
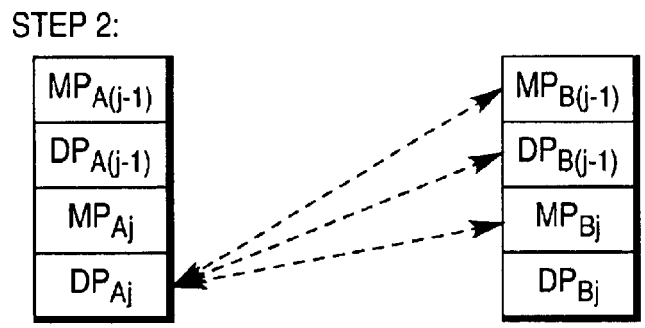
Figure 11C:
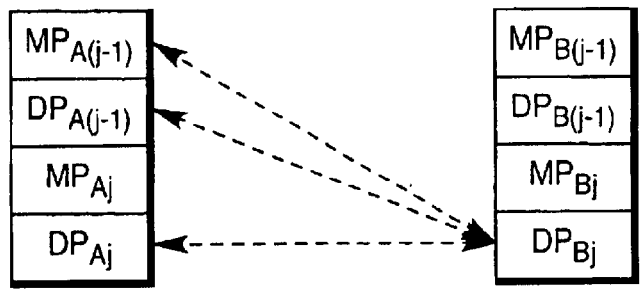

A second step of the third stage is performed, in one embodiment, between $DP_{Aj}$ and three bucket parts on the B side: $MP_{B(j-1)}$, $DP_{B(j-1)}$ and $MP_{Bj}$. The tuples $T_A$ of $DP_{Aj}$ are loaded into a temporary location in the memory 18 ($TP_3$). As soon as a tuple $T_A$ is loaded into the memory 18, the tuple $T_A$ is joined with the tuples 12 in $MP_{B(j-1)}$, $DP_{B(j-1)}$, and $MP_{Bj}$. In other words, the algorithm does not wait until all tuples $T_A$ are loaded into the temporary location. As shown in FIG. 11B, all tuples from each part are joined: tuples from $DP_{Aj}$ with tuples from $MP_{B(j-1)}$; tuples from $DP_{Aj}$ with tuples from $DP_{B(j-1)}$; and tuples from $DP_{Aj}$ with tuples from $MP_{Bj}$.

A third step of the third stage is also performed, according to one embodiment. Shown in FIG. 11C, tuples from $DP_{Bj}$ are joined with tuples from $MP_{A(j-1)}$, $DP_{A(j-1)}$, and $DP_{Aj}$. Again, the tuples $T_B$ of $DP_{Bj}$ are loaded into a temporary location 18 in the memory ($TP_4$). As soon as a tuple $T_B$ is loaded, the join operation is performed.

Figure 11D:
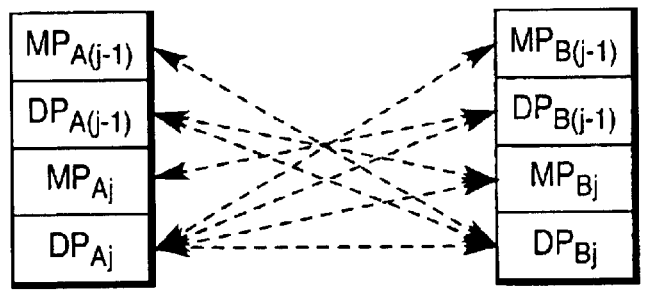

The three steps of the third stage are combined in FIG. 11D. Notice that no join operation is conducted between $MP_{Aj}$ and $DP_{Bj}$ in the third stage. This is because the two were joined at the second stage (see FIG. 9A). The third stage is thus complete for bucket pair $B_{ABj}$. When bucket pair $B_{ABj}$ is processed, the next bucket pair $B_{AB(j+1)}$, is processed, then the next $B_{AB(j+2)}$, and so on, until all bucket pairs are processed.

Figure 12A:
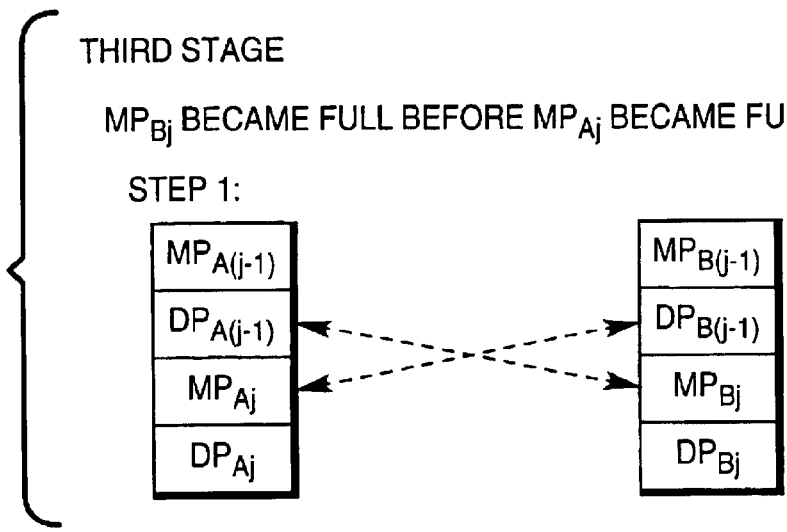
FIGS. 12A–12D are block diagrams of the third stage of the adaptive symmetric band join algorithm according to one embodiment of the invention.
Figure 12B:
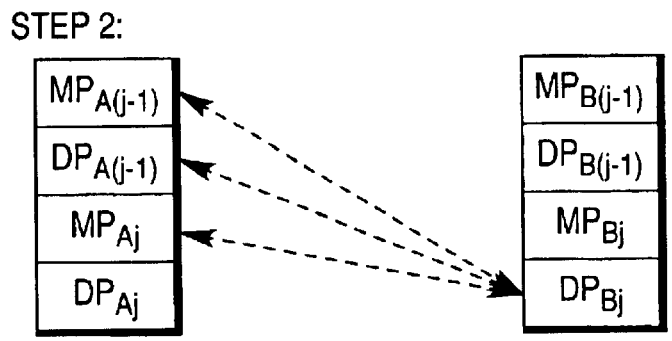
Figure 12C:
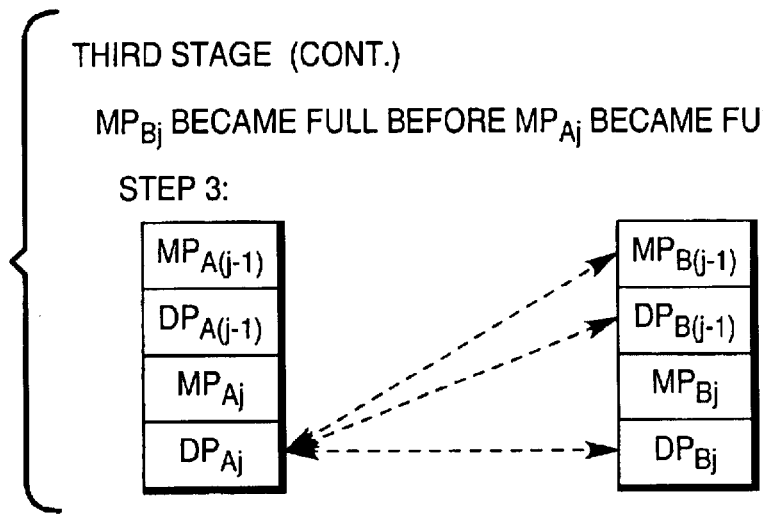
Figure 12D:
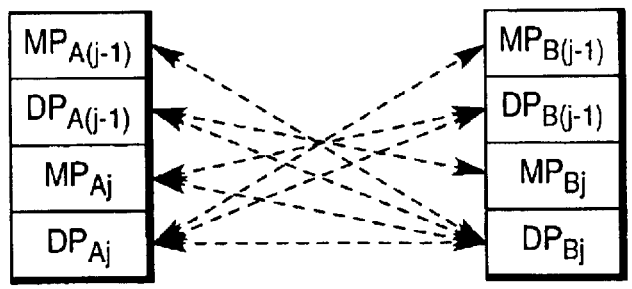

The analogous operations of the third stage may be performed for the case where $MP_{Bj}$ became full before $MP_{Aj}$ did. FIGS. 12A–12D show the third stage, where $MP_{Bj}$ became full before $MP_{Aj}$ became full. The first step of the third stage is depicted in FIG. 12A, the second step in FIG. 12B, and the third step in FIG. 12C. FIG. 12D includes all the steps together.

Because some join processing occurs between the $(j-1)^{th}$ bucket pair $B_{AB(j-1)}$ and the $j^{th}$ bucket pair $B_{ABj}$ the size of the $(j-1)^{th}$ temporary locations $TP_1$ and $TP_2$, may be adjusted downward, in one embodiment. Suppose the $j^{th}$ bucket pair $B_{ABj}$ is being processed, with the join attribute value in the range $[w_{j-1}, w_j)$. Then, for the $(j-1)^{th}$ bucket pair $B_{AB(j-1)}$ only the tuples 12 of $DP_{A(j-1)}$ and $DP_{B(j-1)}$ with the join attribute values within the range $[w_{j-1}-\max\{c_1, c_2\}, w_{j-1})$ in $TP_1$ and $TP_2$ need be kept, according to one embodiment.

The adaptive symmetric band join algorithm, which is performed at each node 10 of the parallel RDBMS 100, thus includes the three stages described above. For the non-blocking parallel band join algorithm, in one embodiment, all the join result tuples are computed once, to ensure that a correct join result is obtained. Further, the non-blocking parallel band join algorithm is non-blocking, which ensures that intermediate results are available. By localizing tuples, which is performed by partitioning using the split vectors and buckets, a more efficient mechanism is provided for performing the join operations. The join results are also obtained and processed randomly ensuring that the intermediate results obtained are meaningful.

The various nodes and systems discussed each includes various software layers, routines, or modules. Such software layers, routines, or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems are stored in respective storage devices. The instructions when executed by a respective control unit cause the corresponding node or system to perform programmed acts.

The instructions of the software routines, modules, or layers are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines, modules, or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
storing first tuples in a first table in a database system;
storing second tuples in a second table in the database system;
partitioning the first and second tuples into plural portions distributed among plural nodes of the database system based on split vectors containing redefined ranges; and
joining the first and second tuples based on the partitioned portions.

2. A method comprising:
storing first tuples in a first table in a database system;
storing second tuples in a second table in the database system;
partitioning the first and second tuples into plural buckets distributed among plural nodes of the database system where the distribution is based on predefined ranges; and
joining the first tuples in one bucket with the second tuples in a plurality of adjacent buckets.

3. A method comprising:
storing first tuples in a first table in a database system;
storing second tuples in a second table in the database system;
partitioning the first and second tuples into plural buckets distributed among plural nodes of the database system where the distribution is based on predefined ranges; and
joining the second tuples in one bucket with the first tuples in a plurality of adjacent buckets.

4. A method of performing a join in a database system having a stable storage and memory, comprising:
storing first tuples in a first table in the database system;
storing second tuples in a second table in the database system;
partitioning the first and second tuples into plural portions;
allocating a first and second portion of the memory;
receiving the first tuple into the first portion of memory;
receiving the second tuple into the second portion of memory;
storing the first and second tuples in the stable storage if the memory overflows; and
joining the first and second tuples where the join operation has plural stages comprising:
joining the first tuples in the first memory portion with the second tuples in the second memory portion; and
where one of the first and second memory portions has filled up with tuples and the other one of the first and second memory portions has not filled up.

5. The method of claim 4, further comprising receiving one of first and second tuples in the one memory portion that has not completely filled up and joining the received one of first and second tuples with the other one of the first and second tuples in the memory portion that has filled up.

6. The method of claim 4, wherein joining the first and second tuples comprises a third stage in which first and second tuples stored in the memory and in the stable storage are joined.

7. A method of performing a join in a database system having plural nodes where each node comprises a memory and a stable storage, the method comprising:
storing first tuples in a first table accessible by the plural nodes;
storing second tuples in a second table accessible by the plural nodes;
randomly selecting any first tuple to be joined with any second tuple;
joining first tuples in the memory of each node with second tuples in the memory of each node when allocated portions of the memory have not overflowed; and
joining first tuples with second tuples in the memory and stable storage when the allocated portions of the memory have overflowed.

8. A method of performing a join in a database system having plural nodes where each node comprises a memory and a stable storage, the method comprising:
storing first tuples in a first table accessible by the plural nodes;
storing second tuples in a second table accessible by the plural nodes; and
performing join operations between the first tuples and the second tuples, wherein;
an intermediate result is produced after any first tuple is joined with any second tuple;
the first tuples are joined to second tuples in the memory of each node when allocated portions of the memory have not overflowed; and
the first tuples are joined with second tuples in the memory and the stable storage when the allocated portions of the memory have overflowed.

9. A method of performing a join in a database system having plural nodes where each node comprises a memory and a stable storage, the method comprising:
storing first tuples in a first table accessible by the plural nodes;
storing second tuples in a second table accessible by the plural nodes; and
performing join operations between the first tuples and the second tuples, wherein:
the selection of any first tuple to be joined with any second tuple is made once;
the first tuples are joined to second tuples in the memory of each node when allocated portions of the memory have not overflowed; and
the first tuples are joined with second tuples in the memory and the stable storage when the allocated portions of the memory have overflowed.

10. An article comprising a medium storing instructions for enabling a processor-based system to:
store first tuples in a first table in a database system;
store second tuples in a second table in the database system;
partition the first and second tuples into plural portions distributed among plural nodes of the database system based on split vectors containing predefined ranges; and
join the first and second tuples based on the partitioned portions.

11. An article comprising a medium storing instructions for enabling a processor-based system to:
    store first tuples in a first table in a database system;
    store second tuples in a second table in the database system;
    partition the first and second tuples into buckets distributed among plural nodes of the database system based on predefined ranges; and
    join first tuples in one bucket with second tuples in a plurality of adjacent buckets.

12. An article comprising a medium storing instructions for enabling a processor-based system to:
    store first tuples in a first table in a database system;
    store second tuples in a second table in the database system;
    partition the first and second tuples into buckets distributed among plural nodes of the database system based on redefined ranges; and
    join the second tuples in one bucket with first tuples in a plurality of adjacent buckets.

13. An article comprising a medium storing instructions for enabling a processor-based system to:
    store first tuples in a first table in a database system;
    store second tuples in a second table in the database system;
    partition the first and second tuples into plural portions;
    join the first and second tuples based on the partitioned portions;
    receive first and second tuples in a memory;
    join first tuples in the memory with second tuples in the memory;
    store first and second tuples in a stable storage if the memory overflows;
    allocate a first portion of the memory to store the first tuples and allocating a second portion of the memory to store the second tuples; and
    performing a join operation having plural stages, a first stage comprising joining the first tuples in the first memory portion with the second tuples in the second memory portion.

14. The article of claim 13, further storing instructions for enabling a processor-based system to:
    receive one of first and second tuples in the one memory portion that has not completely filled up and joining the received one of first and second tuples with the other one of the first and second tuples in the memory portion that has filled up.

15. The article of claim 13, further storing instructions for enabling a processor-based system to:
    joining the first and second tuples during a third stage in which first and second tuples stored in the memory and in the stable storage are joined.

16. A system comprising:
    a processor;
    a storage;
    plural nodes each comprising a memory; and
    instructions executable by the processor, for enabling the system to:
        store first tuples in a first table accessible by the plural nodes;
        store second tuples in a second table accessible by the plural nodes; and
    perform join operations between the first tuples and the second tuples, wherein:
        the selection of any first tuple to be joined with any second tuple is random;
        joining first tuples in the memory of each node with second tuples in the memory of each node when allocated portions of the memory have not overflowed; and
        joining first tuples with second tuples in the memory and storage when the allocated portions of the memory have overflowed.

* * * * *

UNITED STATES PATENT AND TRADEMARK OFFICE
CERTIFICATE OF CORRECTION

PATENT NO. : 6,804,678 B1
DATED : October 12, 2004
INVENTOR(S) : Luo, G., Ellmann, C. and Naughton, J.

It is certified that error appears in the above-identified patent and that said Letters Patent is hereby corrected as shown below:

Column 13,
Line 12, delete "redefined " and insert -- predefined --.

Signed and Sealed this

Thirty-first Day of January, 2006

JON W. DUDAS
*Director of the United States Patent and Trademark Office*